(12) United States Patent
Kim

(10) Patent No.: US 9,096,209 B2
(45) Date of Patent: Aug. 4, 2015

(54) CONTROL SYSTEM AND METHOD FOR HYBRID VEHICLE

(75) Inventor: Sang Joon Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 853 days.

(21) Appl. No.: 12/961,227

(22) Filed: Dec. 6, 2010

(65) Prior Publication Data

US 2012/0072061 A1  Mar. 22, 2012

(30) Foreign Application Priority Data

Sep. 17, 2010  (KR) ........................ 10-2010-0092056

(51) Int. Cl.
| | |
|---|---|
| *B60W 10/24* | (2006.01) |
| *B60W 20/00* | (2006.01) |
| *B60W 10/06* | (2006.01) |
| *B60W 10/08* | (2006.01) |

(52) U.S. Cl.
CPC .............. *B60W 10/06* (2013.01); *B60W 10/08* (2013.01); *B60W 20/00* (2013.01); *B60W 20/10* (2013.01); *B60W 2510/244* (2013.01); *B60W 2540/10* (2013.01); *B60W 2540/12* (2013.01); *B60W 2550/13* (2013.01); *B60W 2550/142* (2013.01); *B60W 2550/145* (2013.01); *Y02T 10/56* (2013.01); *Y02T 10/6286* (2013.01); *Y10S 903/903* (2013.01); *Y10S 903/915* (2013.01)

(58) Field of Classification Search
USPC ............. 701/22; 180/65.265, 65.29; 903/904, 903/930, 903, 915; 290/40 R; 252/182.1; 473/3
See application file for complete search history.

(56) References Cited

U.S. PATENT DOCUMENTS

| | | | | |
|---|---|---|---|---|
| 5,778,326 | A  * | 7/1998 | Moroto et al. .................. 701/22 |
| 5,881,559 | A  * | 3/1999 | Kawamura ...................... 60/597 |
| 6,018,694 | A  * | 1/2000 | Egami et al. ................... 701/102 |
| 6,262,491 | B1 * | 7/2001 | Kitajima et al. ............ 290/40 C |
| 6,362,536 | B1 * | 3/2002 | Izumiura et al. ............ 290/40 C |
| 7,506,639 | B2 * | 3/2009 | Saito ............................. 123/520 |

(Continued)

FOREIGN PATENT DOCUMENTS

| | | | |
|---|---|---|---|
| JP | 6-285834 | * | 10/1994 |
| JP | 10-150701 | A | 6/1998 |

(Continued)

OTHER PUBLICATIONS

New static var compensator control strategy and coordination with under-load tap changer; Abdel-Rahman, Mansour H.; Youssef, Fathi M H; Saber, Ahmed A.; Power Delivery, IEEE Transactions on; vol. 21, Issue: 3; Digital Object Id: 10.1109/TPWRD.2005.858814; Pub. Yr: 2006, pp. 1630-1635.*

(Continued)

*Primary Examiner* — Cuong H Nguyen
(74) *Attorney, Agent, or Firm* — Mintz Levin Cohn Ferris Glovsky and Popeo, P.C.; Peter F. Corless

(57) ABSTRACT

The present invention relates to a control system and a method for a hybrid vehicle which may optimally control the operating point of a vehicle. A control method for a hybrid vehicle includes detecting driving requests and a state of charge (SOC) of a battery when the vehicle is driving in HEV mode, determining a motor operating point and an engine operating point when the battery is in low SOC state, and compensating the motor operating point and the engine operating point by applying a climbing degree of the vehicle and the atmospheric pressure.

2 Claims, 2 Drawing Sheets

(56) References Cited

U.S. PATENT DOCUMENTS

| | | | |
|---|---|---|---|
| 8,700,243 B2* | 4/2014 | Kamijo | 701/22 |
| 2001/0025220 A1* | 9/2001 | Kaneko et al. | 701/112 |
| 2009/0173066 A1* | 7/2009 | Duray | 60/413 |
| 2012/0006288 A1* | 1/2012 | Winstead | 123/58.8 |
| 2013/0066494 A1* | 3/2013 | Kamijo | 701/22 |
| 2014/0046526 A1* | 2/2014 | Oikawa | 701/22 |

FOREIGN PATENT DOCUMENTS

| | | | |
|---|---|---|---|
| JP | 11-103501 A | | 4/1999 |
| JP | 11-226927 | * | 8/1999 |
| JP | 11-226928 | * | 8/1999 |
| JP | 2000-184509 A | | 6/2000 |
| JP | 2007-118918 A | | 5/2007 |
| JP | 2007-131070 A | | 5/2007 |
| JP | 2007-309301 A | | 11/2007 |
| JP | 2009-018719 A | | 1/2009 |
| KR | 10-2003-0034802 A | | 5/2003 |
| WO | PCT/JP97/02653 | * | 7/1997 |
| WO | PCT/JP11/70771 | * | 5/2012 |
| WO | PCT/JP2011/060173 | * | 3/2013 |

OTHER PUBLICATIONS

Model Predictive Control of hybrid fuel cell/battery/supercapacitor power sources; Amin ; Trilaksono, Bambang Riyanto ; Sasongko, Arif ; Rohman, Arief Syaichu ; Dronkers, Cees Jan ; Ortega, Romeo; System Engineering and Technology (ICSET), 2012 International Conf on; Digital Object Id: 10.1109/ICSEngT.2012.6339314; Pub Yr. 2012 , pp. 1-6.*

ILook-ahead intelligent energy management of a parallel hybrid electric vehicle; Ganji, B. ; Kouzani, A.Z. ; Khayyam, H. Fuzzy Systems (FUZZ), 2011 IEEE International Conference on; DOI: 10.1109/FUZZY.2011.6007495 Publication Year: 2011 , pp. 2335-2341.*

Comparison of On-Board Charging Strategies for Range-Extender Hybrid Vehicles with Lead-Acid Batteries; Bhiwapurkar, N. ; Ganti, V.; Vehicle Power and Propulsion Conference (VPPC), 2013 IEEE;M DOI: 10.1109/VPPC.2013.6671669 Publication Year: 2013 , pp. 1-5.*

Hybrid energy storage systems and battery management for electric vehicles; Sangyoung Park ; Younghyun Kim ; Naehyuck Chang; Design Automation Conference (DAC), 2013 50th ACM / EDAC / IEEE; Publication Year: 2013 , pp. 1-6.*

Correctional DP-based Energy Management Strategy of Plug-in Hybrid Electric Bus for City-Bus-Route; Li, L. ; Yang, C. ; Zhang, Y. ; Zhang, L. ; Song, J.; Vehicular Technology, IEEE Transactions on; vol. PP , Issue: 99; DOI: 10.1109/TVT.2014.2352357 Publication Year: 2014 , pp. 1.*

Model predictive control of a power-split hybrid electric vehicle system with slope information; Yu, Kaijiang ; Mukai, Masakazu ; Kawabe, Taketoshi; SICE Annual Conference (SICE), 2013 Proceedings of; Publication Year: 2013 , pp. 2311-2316.*

A hybrid cascaded multi-level converter for power storage system; Zedong Zheng ; Kui Wang ; Ling Peng ; Yongdong Li ; Lie Xu Power Electronics and Applications (EPE), 2013 15th European Conference on; DOI: 10.1109/EPE.2013.6631778; Publication Year: 2013 , pp. 1-10.*

Power Distribution Control for a Fuel Cell Hybrid Electric Bus; He Hong-wen ; Zhang Cheng-ning ; Yu Xiao-jiang; Vehicle Power and Propulsion Conference, 2007. VPPC 2007. IEEE; DOI: 10.1109/VPPC.2007.4544098; Publication Year: 2007 , pp. 62-65.*

Performance evaluation of Multilevel Converter based cell balancer with reciprocating air flow; Altaf, F.; Johannesson, L.; Egardt, B.; Vehicle Power and Propulsion Conference (VPPC), 2012 IEEE; DOI: 10.1109/VPPC.2012.6422634; Publication Year: 2012 , pp. 706-713.*

An abstract of "State-of-Charge estimation algorithms and their implications on cells in parallel"; Tripathy, Y.; McGordon, A.; Marco, J.; Gama-Valdez, M.; Electric Vehicle Conference (IEVC), 2014 IEEE International; DOI: 10.1109/IEVC.2014.7056168; Publication Year: 2014 , pp. 1-6.*

Kinetic energy storage for vehicles; Pullen, K.R.; Ellis, C.W.H.; Hybrid Vehicle Conference, IET The Institution of Engineering and Technology, 2006; Publication Year: 2006 , pp. 91-108.*

* cited by examiner

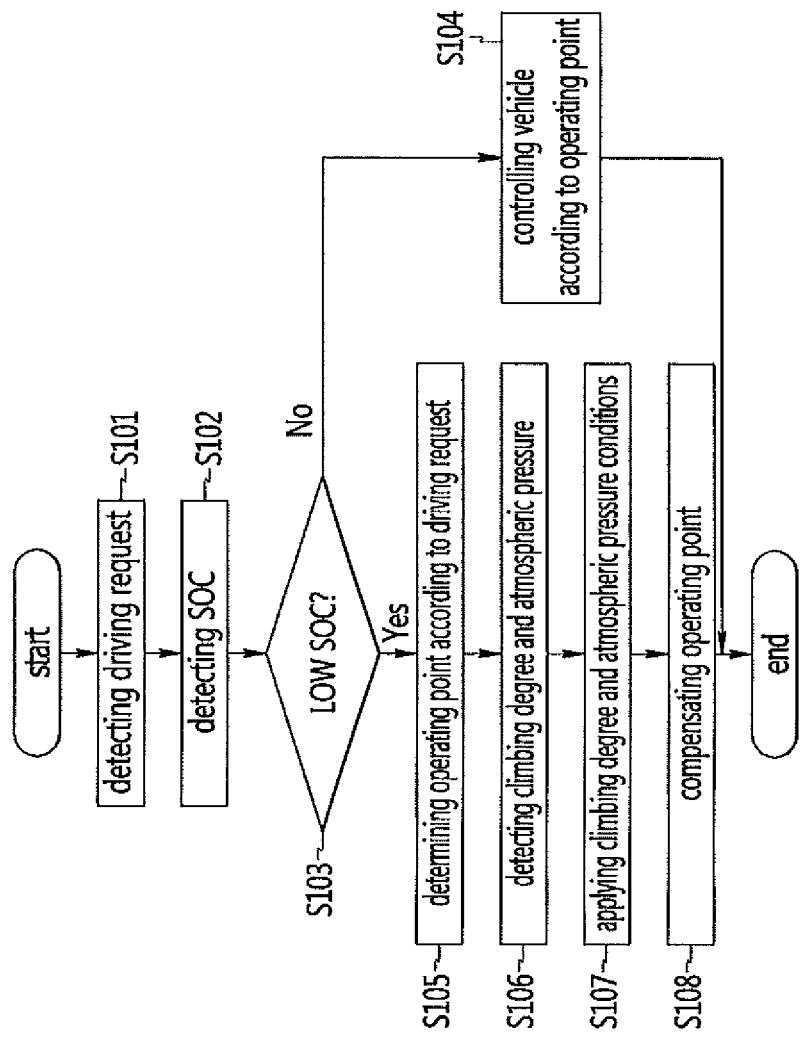

CONTROL SYSTEM AND METHOD FOR HYBRID VEHICLE

CROSS-REFERENCE TO RELATED APPLICATION

This application claims priority to and the benefit of Korean Patent Application No. 10-2010-0092056 filed in the Korean Intellectual Property Office on Sep. 17, 2010, the entire contents of which are incorporated herein by reference.

BACKGROUND OF THE INVENTION (a) Field of the Invention

The present invention generally relates to a hybrid vehicle. More particularly, the present invention relates to a control system and a method for a hybrid vehicle which may optimally control the operating point of a vehicle.

(b) Description of the Related Art

A hybrid vehicle uses an engine and a motor as power sources. By selectively using the engine and the motor as the power sources, hybrid vehicles can beneficially enhance energy efficiency and reduce exhaust gas.

Driving modes of the hybrid vehicle can be divided into an engine mode (driving by an engine), an EV mode (driving by a motor), and an HEV mode (driving by an engine and a motor simultaneously).

By appropriately harmonizing power sources of the engine and the motor leads, fuel efficiency can be enhanced.

In the HEY mode, the driver's requirements induce an operating point as an optimal efficiency of a system that is calculated by torques and speeds of the engine and motor. In particular, the driver's requirements may be calculated by the sum of optimal torque of a motor and optimal torque of an engine.

However, in abnormal conditions, such as in high SOC (State Of Charge) conditions (i.e., above a preset SOC), the operating point is compensated for discharging (discharging of the battery, and in low (i.e., below a preset value) SOC conditions, the operating point is compensated for charging (charging the battery). Thus, if a battery is in a low SOC and a vehicle is being driven in the HEV mode, engine power is delivered for charging the battery and for driving the vehicle simultaneously. For example, if the vehicle is driven in the HEV mode, in low speed on a hill in low SOC, the engine is operated in low RPM which results in bad vibration characteristics with high torque, and thus terrible vibration is generated.

In an attempt to solve this problem, a shift speed can be kept in a low shift speed and the engine RPM is increased so as to reduce the vibration characteristic. However, in these conditions, while the vehicle vibration may be reduced, the engine RPM may be higher than required thereby making the passengers feel uncomfortable.

Further, although the driver's requirements are calculated by the sum of optimal torque of a motor and optimal torque of an engine, the real output torque of the engine may be lower than the optimal output torque of the engine in low atmospheric pressure, for example in high altitude. Thus, the real output torque of the motor would need to be higher than the optimal output torque of the motor in order to satisfy the driver's requirements. As a result, the vehicle efficiency is deteriorated and the battery is excessively discharged.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention generally provides a control system and a method for a hybrid vehicle which controls the operating point of a vehicle so as to enhance driver and passenger comfort. In particular, the present control system and method controls the operating conditions of a vehicle when going uphill in the HEY mode and in a low SOC so as to increase the stability and reliability of the vehicle.

In accordance with an embodiment of the present invention, a control system and a method for a hybrid vehicle is provided which prohibits compensation of a motor operating point when a vehicle is driving in low atmospheric pressure, for example in high altitude.

According to a preferred embodiment, a control system for a hybrid vehicle may include a driving request detecting unit for detecting driving requests which may include, for example, operations of an accelerator pedal and a brake pedal; an operating point determining unit for determining a motor operating point and an engine operating point according to the driving requests and a state of charge (SOC) of a battery; and an operating point compensation unit which compensates the motor operating point and the engine operating point by applying the motor operating point and the engine operating point as determined by the operating point determining unit, the climbing degree of the vehicle (i.e. the degree of incline), and the atmospheric pressure.

In some embodiments, the operating point compensation unit may keep a shift speed in a low shift speed so as to increase engine RPM when the vehicle is driving in a high climbing degree (high degree of incline), in HEV mode and in a low SOC.

In some embodiments, the operating point compensation unit may limit charging amount by a motor when the vehicle is driving in a low climbing degree (below a preset degree of incline), in HEV mode and in a low SOC (i.e., below a preset SOC).

In some embodiments, the operating point compensation unit may prohibit compensation of the motor operating point when the vehicle is driving in HEV mode, in a low SOC and in low atmospheric pressure (i.e., below a preset atmospheric pressure).

According to another embodiment of the present invention, a control method for a hybrid vehicle is provided which may include detecting driving requests and a state of charge (SOC) of a battery when the vehicle is driving in HEV mode, determining a motor operating point and an engine operating point when the battery is in a low SOC, and compensating the motor operating point and the engine operating point by applying the climbing degree (degree of incline) and atmospheric pressure.

In accordance with some embodiments, the shift speed may be kept in a low shift speed (i.e., below a preset shift speed) so as to increase engine RPM when the vehicle is driving in a high climbing degree.

In accordance with some embodiments, the charging amount (of the battery) by the motor may be limited when the vehicle is driving in a low climbing degree so as to prevent or reduce the generation of vibration.

According to some embodiments, the compensation of the motor operating point may be prohibited when the vehicle is driving in low atmospheric pressure.

According to an exemplary embodiment of the present invention, the climbing degree of a vehicle is detected when the vehicle is in the HEV mode and in a low SOC considering the driver's requirements, such that if a vehicle is driving at a low climbing degree (low degree of incline) then the charging amount by the motor is limited (i.e. for operating electric elements except for driving the motor) so as to reduce engine output, and if a vehicle is driving at a higher climbing degree (high degree of incline), charging amount by the motor is increased to enhance driver and passenger comfort.

According to an exemplary embodiment of the present invention, compensation of the motor operating point is further prohibited when a vehicle is driving in relatively low atmospheric pressure, for example in high altitude, so that SOC may be more stably maintained.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

FIG. 2 is a flowchart of a control method for a hybrid vehicle according to an embodiment of the present invention.

DESCRIPTION OF SYMBOLS

Figure 1:
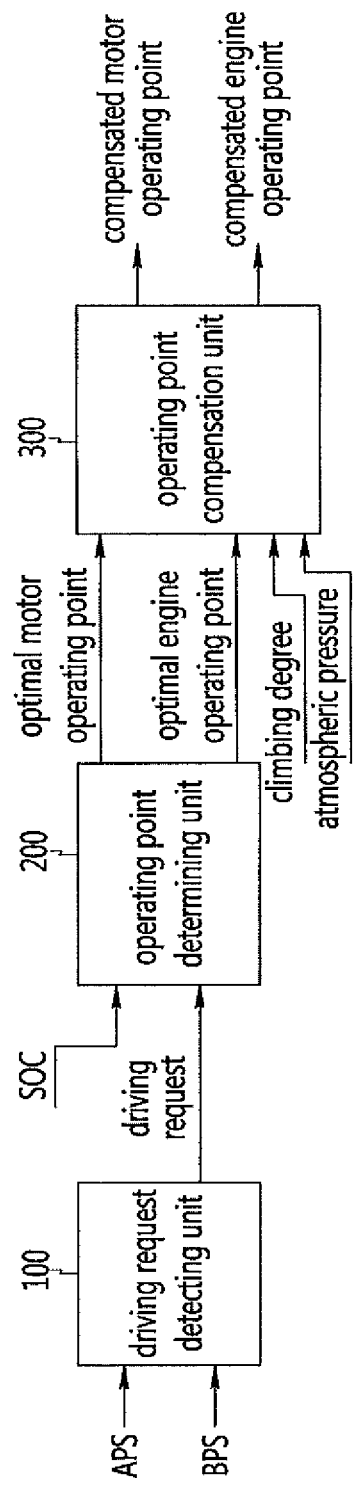
FIG. 1 is a graph showing a control system for a hybrid vehicle according to an embodiment of the present invention.

100: driving request detecting unit
200: operating point determining unit
300: operating point compensation unit

DETAILED DESCRIPTION OF THE EMBODIMENTS

Hereinafter, referring to the drawings, exemplary embodiments of the present invention will be described in detail.

As those skilled in the art would realize, the described embodiments may be modified in various different ways, all without departing from the spirit or scope of the present invention. Description of components that are not necessary for explaining the present invention will be omitted, and the same constituent elements are denoted by the same reference numerals in this specification.

FIG. 1 is a graph showing a control system for a hybrid vehicle according to one embodiment of the present invention.

Referring to FIG. 1, a control system for a hybrid vehicle according to an embodiment of the present invention includes a driving request detecting unit 100, an operating point determining unit 200, and an operating point compensation unit 300.

The driving request detecting unit 100 detects driving requests including, but not limited to, operation of an accelerator pedal (APS) and operation of a brake pedal (BPS).

The operating point determining unit 200 determines an optimal motor operating point and an optimal engine operating point according to the driving requests as detected by the driving request detecting unit 100, and a state of charge (SOC) of a battery supplied from a Battery Management System (BMS). The BMS is not particularly limited, and can be in accordance with the general design of any conventional BMS.

The operating point compensation unit 300 compensates the motor operating point and the engine operating point by applying the motor operating point and the engine operating point determined by: the operating point determining unit 200, the vehicle climbing degree (degree of incline), and the atmospheric pressure. In particular, according to various embodiments of the invention the operating point compensation unit 300 can be configured to compensate the motor operating point through an Engine Control Unit (ECU) and the engine operating point through a Motor Control Unit (MCU). The ECU and MCU are not particularly limited, and can be in accordance with the general design of any conventional ECU and MCU.

According to a preferred embodiment, the operating point compensation unit 300 is configured to keep the shift speed in a low shift speed so as to increase engine RPM when the vehicle is driving at a high climbing degree, in HEV mode and in low SOC state, and wherein the driver's request is relatively large. As such, the vehicle operates so as to provide driver and passenger comfort.

Further, in accordance with certain embodiments, when the driver's request is relatively small, the charging amount by the motor can be adjusted and changed according to the vehicle climbing degree so as to reduce engine output torque. For example, if a vehicle is driving at a low climbing degree, the charging amount by the motor can be suitably reduced, (i.e. reduced for operating electric elements except for driving the motor), so as to reduce engine output and vibration.

As the vehicle climbing degree increases (degree of incline), a driver will generally push an accelerator pedal to a greater extent, and thus the engine output is increased. As a result, the charging amount by the motor is increased.

In certain embodiments of the present invention, the compensation of the motor operating point is prohibited when the vehicle is driving in low atmospheric pressure, for example in high altitude, so that the battery may not be excessively discharged and SOC may be more stably maintained.

FIG. 2 is a flowchart of a control method for a hybrid vehicle according to an embodiment of the present invention. In particular, the present invention relates to a control system and a method for a hybrid vehicle which may optimally compensate control of the operating point of a vehicle, particularly when a vehicle is driving in an abnormal state in HEV mode. As such, FIG. 2 describes this in detail in connection with an embodiment of the present invention.

The hybrid vehicle, which is provided with the control system according to the present invention, is controlled the same as or similar to that of the conventional art when the vehicle is driving in EV mode or engine mode, so that operations of the EV mode or engine mode will not be described in detail herein, but are in accordance with such conventional operations.

According to an embodiment of the invention, as shown in FIG. 2, when the vehicle provided with the control system according to the present invention is driving in the HEV mode, the driving request detecting unit 100 detects driving requests including, for example, operation of an accelerator pedal (APS) and operation of a brake pedal (BPS), and delivers the detected driving requests to the operating point determining unit 200 (S101).

The operating point determining unit 200 then detects the state of charge (SOC) of the battery, which is supplied from a Battery Management System (BMS) (S102), and determines whether the SOC is in low SOC (S103).

If it is determined that the SOC is not in low SOC in step S103, then the operating point determining unit 200 determines an optimal sum of motor operating point and engine operating point according to the driving requests detected by the driving request detecting unit 100, and controls engine output and motor output accordingly (S104).

On the other hand, if it is determined that the SOC is in low SOC in step S103, then the operating point determining unit 200 determines an optimal motor operating point and an optimal engine operating point according to the driving requests (S105).

The operating point compensation unit 300 next detects a climbing degree (uphill conditions) and an atmospheric pressure (S106), and then compensates the motor operating point and the engine operating point by applying the motor operating point and the engine operating point determined by the operating point determining unit 200 and the climbing degree and the atmospheric pressure (S107).

The operating point compensation unit 300 then compensates the motor operating point through the Engine Control Unit (ECU) and the engine operating point through the Motor Control Unit (MCU).

For example, the operating point compensation unit 300 may keep the shift speed in low shift speed so as to increase the engine RPM, which can make the driver and passengers feel more comfortable when the driver's request is relatively large. When the driver's request is relatively small, charging amount by the motor may be changed according to the climbing degrees so as to reduce engine output torque. For example, if a vehicle is driving at a low climbing degree, then the charging amount by the motor can be reduced (i.e. for operating electric elements except for driving the motor) so as to reduce engine output and vibration.

As the climbing degree increases, a driver will generally pushes on the accelerator pedal to a greater extent, and thus the engine output is increased, which increases the charging amount by the motor.

According to some embodiments of the present invention, the compensation of the motor operating point may be prohibited when a vehicle is driving in low atmospheric pressure, for example in high altitude, so that battery may not be excessively discharged and SOC may be maintained stably.

As referred to herein, the terms "high climbing degree", "low climbing degree", "low SOC", "high SOC" and the like can be readily determined by a person skilled in the art according to kind of motor, engine, battery and other vehicle specifics. Thus, for example, numerical values for such terms are not particularly described herein since such numerical values will vary according to vehicle type and vehicle component properties, and these values can be readily determined.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A control method for a hybrid vehicle comprising:
   detecting, by a driving request detecting unit, when either an accelerator or brake pedal is operated;
   determining, by an operating point determining unit, a state of charge (SOC) of a battery when the vehicle is driving in a hybrid electric vehicle mode;
   measuring, by an operating point compensation unit, a degree of incline a vehicle is currently traveling on and determining an atmospheric pressure that the vehicle is currently driving in;
   determining, by the operating point determining unit, a motor operating point and an engine operating point when the battery is below a preset SOC; and
   compensating, by the operating point compensation unit, the motor operating point and the engine operating point by applying the degree of incline of the vehicle and the atmospheric pressure to a compensation calculation,
   wherein a shift speed is kept below a certain shift speed to increase an engine RPM when the vehicle is driving above a first certain climbing degree, and
   wherein the charging amount of the battery by the motor is limited when the vehicle is driving below to a second certain climbing degree to prevent or reduce generation of vibration.

2. The method of claim 1, wherein compensation of the motor operating point is prohibited when the vehicle is driving in below a preset atmospheric pressure.

* * * * *